United States Patent [19]
Iijima

[11] Patent Number: 5,692,009
[45] Date of Patent: Nov. 25, 1997

[54] JITTER MEASURING METHOD AND APPARATUS

[75] Inventor: Masahiko Iijima, Kanagawa-ken, Japan

[73] Assignee: Leader Electronics Corporation, Kanagawa-ken, Japan

[21] Appl. No.: 316,104

[22] Filed: Sep. 30, 1994

[30] Foreign Application Priority Data

Oct. 1, 1993 [JP] Japan .................................. 5-247042

[51] Int. Cl.⁶ .............................. H04B 3/46; H04B 17/00; H04Q 1/20
[52] U.S. Cl. .................. 375/226; 324/76.77; 371/1
[58] Field of Search ........................ 375/224, 226, 375/371, 372, 373–376, 228; 370/100.1, 13, 169, 241, 252; 328/63, 72, 155; 330/1 A; 371/3, 20.1, 24, 1; 455/226.1, 226.4; 324/617, 76.24, 76.38, 76.77

[56] References Cited

U.S. PATENT DOCUMENTS 5,293,520  3/1994  Hayashi .............................. 324/76.77

FOREIGN PATENT DOCUMENTS 62-134861  6/1987  Japan .

OTHER PUBLICATIONS

"Avoiding the Pitfalls in Serial Digital Signal Distribution", Ron Ward, SMPTE Journal, Jan. 1993, pp. 14–23.

Catalog 1991/1992 of CD Jitter Meter LJM–1851 manufactured by Leader Electronics Corp., printed Oct. 1991.

Instruction Manual of Pulse Jitter Counter TR5834/5835 manufactured by Advantest Corp., copyright 1984, pp. 3–1 –3–14.

"A New Method of Measuring PCM jitter in Digital Audio Equipment" by Mishio Hayasi, Kouji Nakagome and Masaaki Hirose of Advantest Corp., Date draft received by the publisher Apr. 28, 1986.

Primary Examiner—Tesfaldet Bocure
Assistant Examiner—Bryan Webster
Attorney, Agent, or Firm—Fish & Richardson PC

[57] ABSTRACT

A jitter measuring method and apparatus is provided which is capable of measuring jitters in serial digital signals transmitted at a high bit rate. The method and apparatus detects from a serial digital signal frequency deviations of a predetermined frequency corresponding to a predetermined period. The detected frequency deviations are converted to period deviations of the predetermined period.

17 Claims, 3 Drawing Sheets

SERIAL DIGITAL SIGNAL

JITTER MEASURING METHOD AND APPARATUS

BACKGROUND OF THE INVENTION

1. Field of the Invention

The present invention relates to a method and apparatus for measuring time-related jitters, i.e., fluctuations or variations associated with signals such as digital data signals.

2. Prior Art

Conventionally, the following three methods have been mainly used for measuring jitters in a digital data signal transmitted at a fixed bit rate, which occur in time intervals of one or more bits in a digital signal. A first method measures jitters by observing eye patterns. Specifically, a serial digital signal is applied to a vertical axis input of an oscilloscope, while a clock pulse signal synchronized with the digital signal is reproduced and applied to a sweep trigger input of the oscilloscope, in order to display an eye pattern on the screen thereof. The amount or magnitude of the jitter in a certain time interval can be visually determined from the displayed eye patterns. A second method includes shaping an input serial digital signal, and counting the number of reference clock pulses appearing during the pulse width of each of shaped pulses in the resultant digital signal. Fluctuations in the number of the reference clock pulses counted during respective pulses represent the amount of the jitter. A third method includes shaping pulses in an input serial digital signal, converting the width of each shaped pulse into a voltage, filtering this voltage signal, and displaying the amount of changes in voltage of the filtered signal as the amount of the jitter.

The first method, however, involves a problem that fluctuations which actually are not called jitters may be designated as jitters. More specifically, regular fluctuations in time intervals of respective bits in a digital signal caused by a limited band in a transmission path of the digital signal, and jitters which are short-term fluctuations in the bit time intervals may appear to be substantially similar on displayed eye patterns. However, the former fluctuations in the bit time intervals of a digital signal caused by the limited band may be substantially eliminated if an appropriate equalizer is used. It is therefore understood that the first method is not appropriate to the measurement of jitters if a digital signal under measurement is transmitted via a transmission path in which the band limitation causes the waveform of the digital signal to be largely degraded.

The second method, on the other hand, requires the frequency of the reference clock and the operating speed of the counter to be higher, as a digital signal under measurement has a higher bit rate or frequency. In the third method, on/off switching time of elements used in a jitter measuring circuit largely affects the measurement of jitters as the bit rate of a digital signal under measurement is higher. Thus, if the second or third method is used to measure jitters of a digital data signal transmitted at a high bit rate, for example, at 100 Mbit/second or more, a measuring circuit required therefor is quite difficult to be realized.

SUMMARY OF THE INVENTION

It is therefore an object of the present invention to provide a method and apparatus for measuring jitters, which are capable of measuring jitters in a digital data signal transmitted at a high bit rate.

It is another object of the present invention to provide a method and apparatus for measuring jitters, which are capable of measuring jitters, i.e., fluctuations or variations in time intervals of respective signals in a digital data signal transmitted at a high bit rate.

It is another object of the present invention to provide a method and apparatus for measuring jitter, which are capable of accurately measuring such time interval jitters of each of signals in a digital data signal.

According to one aspect of the present invention, a method for measuring a jitter in a digital data signal transmitted at a bit rate, comprises the steps of: (a) defining a predetermined period associated with predetermined waveform portions included in said digital data signal, said predetermined waveform portions being used for measuring the jitter in the digital data signal; (b) defining a maximum width of fluctuation of period for fluctuations of periods of said predetermined waveform portions from said predetermined period, said fluctuations of the periods of said predetermined waveform portions from said predetermined period being detected as the jitter; (c) detecting a signal from said digital data signal, said detected signal including frequency components within a first range of frequency, said first range of frequency including a predetermined frequency corresponding to said predetermined period and having a bandwidth corresponding to said maximum width of fluctuation of period; and (d) displaying said jitter from said detected signal.

According to the present invention, said step of displaying displays said jitter using said detected signal and a first oscillation signal having a first frequency. Further according to the present invention, said first frequency may be equal to said predetermined frequency.

According to the present invention, said first frequency may be lower than said predetermined frequency. In this case, said step of detecting may include the steps of: (a) converting the frequency of said digital data signal such that said predetermined frequency of said digital data signal is down-converted to be equal to said first frequency being lower than said predetermined frequency to thereby generate a frequency converted signal; and (b) detecting from said frequency converted signal frequency components present in a second range of frequency including said first frequency and having said bandwidth. Also, said step of converting may include mixing said digital data signal with a second oscillation signal having a second frequency, the difference between said second frequency and said predetermined frequency being equal to said first frequency.

Also according to the present invention, said step of displaying may display said jitter in the form of vector or in the form of eye pattern from said detected signal and said first oscillation signal.

According to another aspect of the present invention, an apparatus for measuring a jitter in a digital data signal transmitted at a bit rate, comprises: (a) detecting means coupled to receive said digital data signal for generating a detected signal including frequency components present within a first range of frequency in said digital data signal, said first range of frequency being determined by a predetermined frequency and a bandwidth, said predetermined frequency corresponding to a predetermined period associated with predetermined waveform portions included in said digital data signal, said predetermined waveform portions being used for measuring the jitter in the digital data signal, said bandwidth corresponding to a maximum width of fluctuation of period for fluctuations of periods of said predetermined waveform portions from said predetermined period, said fluctuations of the periods of said predetermined waveform portions from said predetermined period being detected as the jitter; and (b) display means for displaying the jitter from said detected signal and a first oscillation signal having a first frequency.

According to a further aspect of the present invention, an apparatus for measuring a jitter in a digital data signal transmitted at a bit rate, may comprise: (a) detecting means coupled to receive said digital data signal for detecting from said digital data signal frequency deviated components having frequencies deviated from a predetermined frequency, said predetermined frequency corresponding to a predetermined period associated with predetermined waveform portions included in said digital data signal, said predetermined waveform portions being used for measuring the jitter; and (b) converting means for converting said frequency deviated components to a signal representing deviations of periods of said predetermined waveform portions of said digital data signal from said predetermined period.

BRIEF DESCRIPTION OF THE DRAWINGS

The present invention will hereinafter be described in connection with preferred embodiments thereof with reference to the accompanying drawings.

DESCRIPTION OF THE PREFERRED EMBODIMENTS

Figure 1:
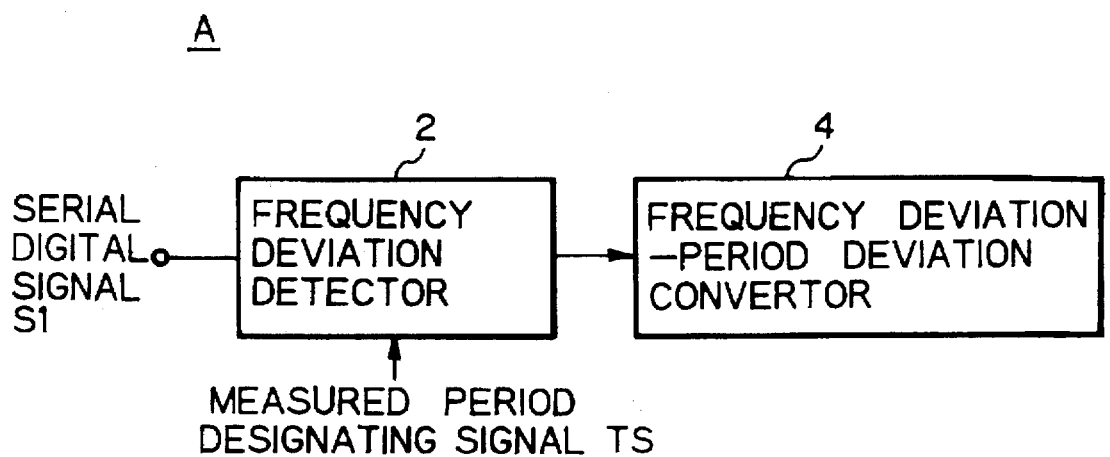
FIG. 1 is a block diagram showing a basic configuration of a jitter measuring apparatus according to the present invention.

FIG. 1 shows a basic configuration of a jitter measuring apparatus, generally designated A, according to the present invention. The jitter measuring apparatus A includes a frequency deviation detector 2 receiving a serial digital signal S1 at an input thereof, and a convertor 4 for converting frequency deviations into period deviations. The frequency deviation detector 2 receives, in addition to the digital signal applied thereto, a signal TS for designating a period associated with "waveform portions under measurement" in the inputted digital signal, which are used for a jitter measurement.

Figure 2:
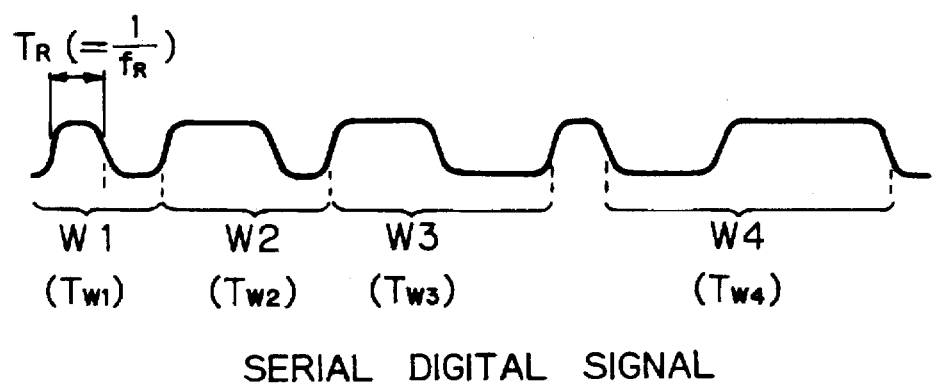
FIG. 2 is a waveform chart showing an illustration of waveforms of a serial digital signal which is transmitted at a certain bit rate.

The "waveform portion under measurement" will now be explained with reference to FIG. 2. Illustrated is an example of a waveform, forming part of the serial digital signal S1 transmitted at a certain bit rate, where $T_R$ represents a period corresponding to one clock period, and is referred to as a reference signal period. Generally, a serial digital signal includes a variety of different inversion periods. For example, a waveform portion W1 has a period $T_{W1}$ which is equal to $2T_R$. Similarly, waveform portions W2, W3, W4 have periods $T_{W2}$, $T_{W3}$, $T_{W4}$ equal to $3T_R$, $4T_R$, $5T_R$, respectively. As will be understood from the foregoing, a serial digital data may have waveform portions with a period equal to k times the reference signal period $T_R$ (k is an integer equal to or more than two).

Referring back to FIG. 1, the detector 2 is designed to receive the measured period designating signal TS in order to measure the jitter or small fluctuations or variations in the time interval of each of such waveform portions having different periods. The detector 2 calculates a frequency under measurement corresponding to the designated measured period, and detects components having frequencies deviated from the measured frequency in the input serial digital signal. A signal having the detected frequency-deviated components is applied to the convertor 4 which converts the frequency-deviated components into components having periods deviated from the measured period. The period deviated components represents the jitter in the measured period of the serial digital signal.

Figure 3:
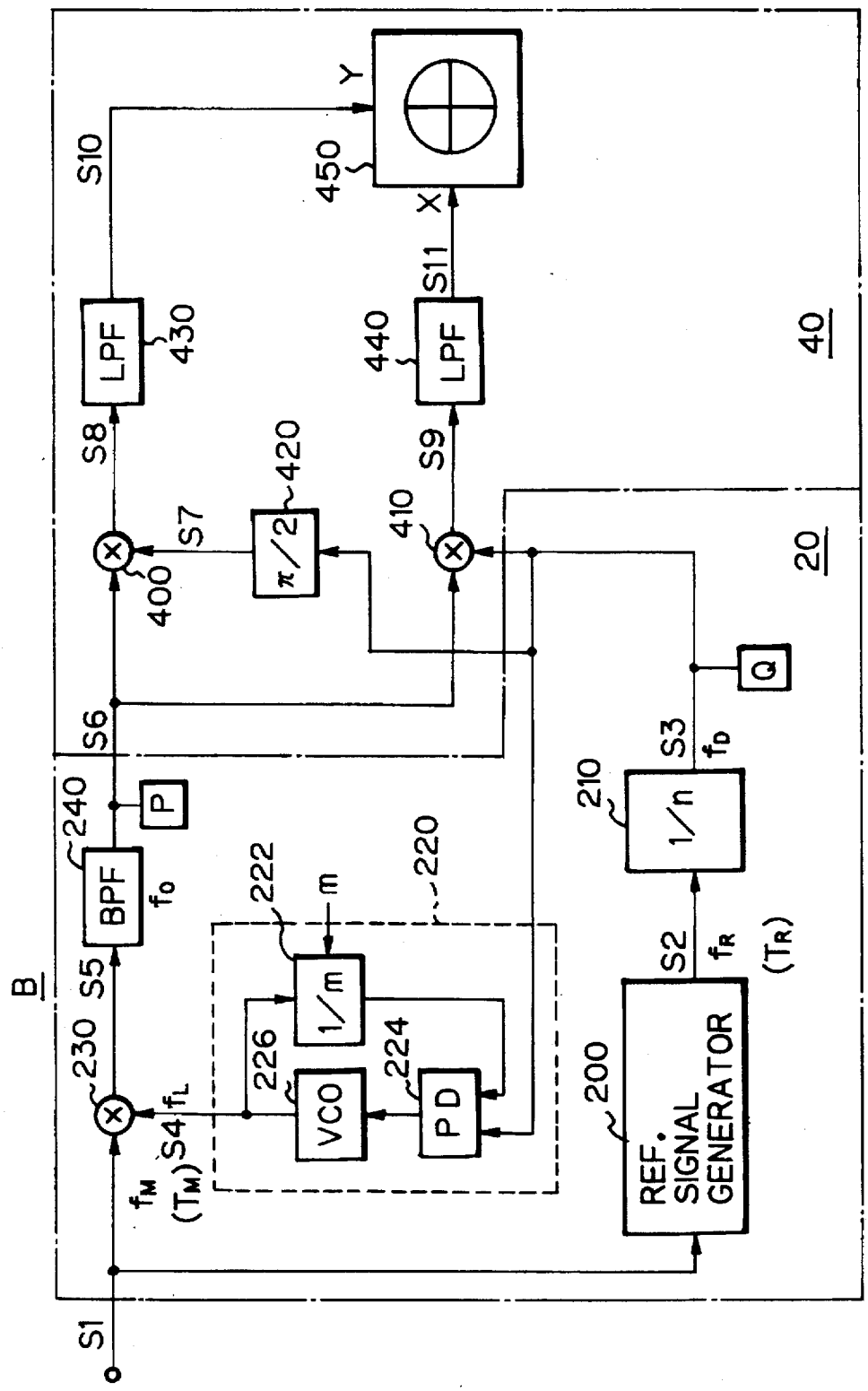
FIG. 3 is a block diagram of a jitter measuring apparatus which embodies the configuration of FIG. 1.

Next, FIG. 3 shows a jitter measuring apparatus B which is a more specific form of the configuration of FIG. 1. The measuring apparatus B comprises a heterodyne detector unit 20 and a vector display unit 40 which correspond to the detector 2 and the convertor 4 in FIG. 1, respectively. The heterodyne detector 20 includes a reference signal generator 200 formed of a PLL (Phase Lock Loop) circuit which generates a reference signal (square wave) S2 having a reference frequency $f_R$ corresponding to the above-mentioned reference signal period $T_R$ of the input serial digital signal S1. The detector 20 also includes a frequency divider 210 for receiving the reference signal S2, dividing it by n, and generating a signal (square wave) S3 at a detected frequency $f_D$. The signal S3 is expressed by the following equation (1):

$$S3 = \cos 2\pi f_D t. \tag{1}$$

It should be noted that in the equation, the output of the frequency divider 210 is treated as a cosine wave, not a square wave, for simplicity.

The heterodyne detector unit 20 further includes a PLL circuit 220 which receives the output S3 of the frequency divider 210 having the detected frequency and generates an oscillating signal (cosine wave) S4 at a local oscillating frequency $f_L$. The PLL circuit 220, as illustrated, includes a 1/m variable frequency divider 222 to which the division ratio m can be specified; a phase detector (PD) 224 which receives the output of the divider 222 and the output of the frequency divider 210; and a voltage controlled oscillator (VCO) 226 which receives the output of the phase detector 224.

The output of the oscillator 226 is applied to the frequency divider 222 as well as to one of the inputs of a mixer 230 which also receives the input serial digital signal S1 at the other input thereof. A mixed output S5 from the mixer 230 is coupled to the input of a bandpass filter (BPF) 240. The center frequency $f_O$ of the passband of the bandpass filter 240 is set equal to the detected frequency $f_D$. The bandwidth BW of the filter 240 may be set in accordance with the characteristics of the input serial digital signal S1 (the magnitude of the bandwidth is determined by an upper limit in frequency of jitters to be measured). The bandpass filter 240 generates a filtered output S6 at its output terminal. The output S6 thus includes frequency components within the bandwidth BW having the detected frequency $f_D$ located at the center thereof, i.e., components having the detected frequency $f_D$ and components having frequencies deviated from the detected frequency. The filtered output S6 is expressed by the following equation (2):

$$S6 = \cos\{2\pi f_D t + \theta + \Delta\theta(t)\}, \tag{2}$$

where $\theta$ is a fixed phase angle, and $\Delta\theta(t)$ is a jittering angle component which varies with time t.

The relationship between the variables k, n and m will be next explained. As will be understood from the foregoing, the variable k represents the ratio of the reference frequency $f_R$ to a measured frequency $f_M$ corresponding to a measured period $T_M$ in the input serial digital signal S1 ($k=f_R/f_M$). The variable n represents the ratio of the reference frequency $f_R$ to the detected frequency $f_D$ ($n=f_R/f_D$). The variable m is calculated by $m=(n-k)/k$, and is used to determine the local oscillation frequency $f_L$ which is employed when the measured frequency and the detected frequency have been selected. The following Table 1 shows examples of possible combinations of values which the variables k, n and m may take.

TABLE 1

| n | m | k |
|---|---|---|
| 3 | 1/2 | 2 |
| 4 | 1 | 2 |
| 4 | 1/3 | 3 |
| 5 | 3/2 | 2 |
| 5 | 2/3 | 3 |
| 5 | 1/4 | 4 |
| 6 | 2 | 2 |
| 6 | 1 | 3 |
| 6 | 1/2 | 4 |
| 6 | 1/5 | 5 |
| 7 | 5/2 | 2 |
| . | . | . |
| 10 | 4 | 2 |
| 10 | 7/3 | 3 |
| 10 | 3/2 | 4 |
| 10 | 1 | 5 |
| . | . | . |

Next, the vector display unit 40 will be explained. The vector display unit 40 includes two multipliers 400 and 410 which respectively receive the output signal S6 of the BPF 240 at one of the inputs thereof. The other input of the multiplier 400 receives an output signal S7 from a 90° phase shifter 420 which is connected to receive the output signal S3 of the frequency divider 210. The signal S7 is expressed by the following equation (3):

$$S7 = \sin 2\pi f_D t. \tag{3}$$

The other input of the multiplier 410 receives the signal S3. The multiplier 400 multiplies the signals received at the two inputs thereof and generates the resultant signal S8 which is expressed by the following equation (4):

$$S8 = \sin\{\theta + \Delta\theta(t)\} + (\sin 2 \cdot 2\pi f_D t)\cos\{\theta + \Delta\theta(t)\}$$
$$+ (\cos 2 \cdot 2\pi f_D t)\sin\{\theta + \Delta\theta(t)\}. \tag{4}$$

The signal S8 is applied to the input of a low pass filter (LPF) 430 which generates a filtered output S10 only including low frequency components at the output thereof. It should be noted that the LPF 430 also removes high frequency components caused by high frequency components included in the square wave of the frequency divider output S3 (the output S3 was considered as a cosine wave in equation (1) for simplifying the equation). The filtered output S10 is expressed by the following equation (5):

$$S10 = \sin\{\theta + \Delta\theta(t)\}. \tag{5}$$

The other multiplier 410 outputs the result of multiplying the two inputs as a signal S9 in a similar manner. The signal S9 is expressed by:

$$S9 = \cos\{\theta + \Delta\theta(t)\} + (\cos 2 \cdot 2\pi f_D t)\cos\{\theta + \Delta\theta(t)\}$$
$$+ (\sin 2 \cdot 2\pi f_D t)\sin\{\theta + \Delta\theta(t)\}. \tag{6}$$

The output S9 is received by the LPF 440 which generates at its output a filtered signal S11 which is expressed by:

$$S11 = \cos\{\theta + \Delta\theta(t)\}. \tag{7}$$

The outputs S10 and S11 from the respective LPFs 430 and 440 are applied to an Y-axis input and an X-axis input of an X-Y monitor scope 450 having a cathode ray tube (CRT).

Next, setting and operations of the jitter measuring apparatus B will be explained. Consider now, by way of example, that waveform portions of a serial digital signal having a period double the reference signal period (W1 in FIG. 2) is subjected to a measurement of jitter. Assume first that the aforementioned division ratio n ($=f_R/f_D$) is set to ten (n=10). Since the measured period $T_M$ for the digital signal is equal to $2T_R$ ($T_M=2T_R$ indicates $f_R=2f_M$), k ($=f_R/f_M$) is calculated to be two (k=2). Thus, the variable m is determined to be four from the foregoing Table 1. The relationship among the measured frequency $f_M$, the detected frequency $f_D$, a local oscillating frequency $f_L$, and the center frequency $f_O$ is expressed by $f_M=0.5f_R$, $f_D=f_O=0.1f_R$, and $f_L=0.4f_R$. The reference frequency $f_R$ is determined by the bit rate of the serial digital signal.

On the other hand, if jitters in waveform portions of the serial digital signal, where $T_M=4T_R$ (W3 in FIG. 2), is to be measured, k=4 is calculated, so that m=3/2 is derived. In a similar measurement in waveform portions where $T_M=3T_R$ (W2 in FIG. 2), k=3 and m=7/3 are derived.

As will be understood from the foregoing, if the bit rate of a serial digital signal subjected to the jitter measurement is known, the division ratio n as well as the center frequency $f_O$ ($=f_D$) and bandwidth BW of the BPF 240 may be fixed. In this case, only changing the division ratio m enables the jitter measurement to be made for waveform portions having different periods.

Figure 4:
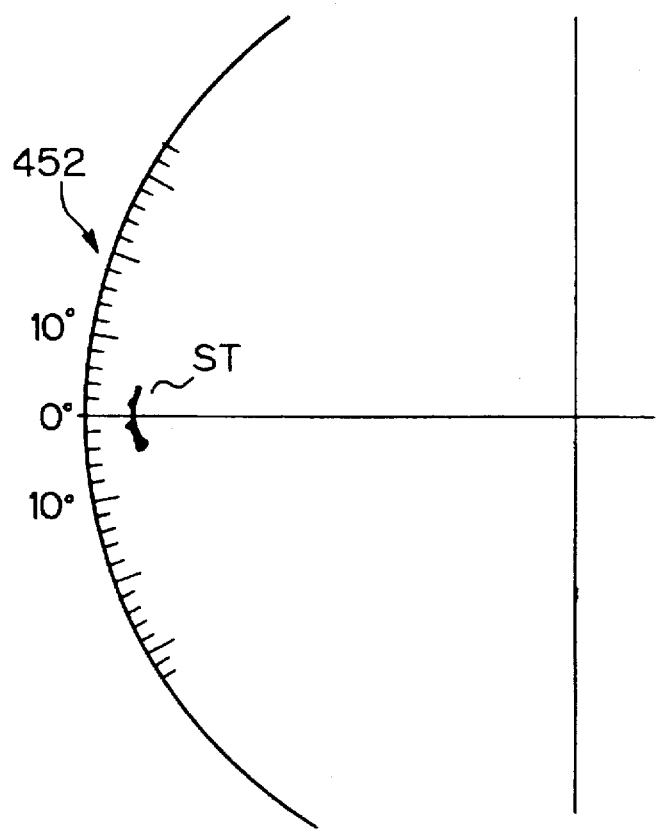
FIG. 4 is a diagram showing an example of how a jitter is displayed on an X-Y monitor shown in FIG. 3.

FIG. 4 shows how a jitter is displayed on the screen of an X-Y monitor 450 with the above-mentioned setting. Specifically, illustrated in FIG. 4 is an enlarged view of the screen of the monitor 450 which has a scale 452 for the reading of the magnitude of jitters, which is angularly graduated every two degrees on the periphery of the circular scale. A trace ST of an illuminated spot representing an angular jitter indicates an angular range of fluctuation of a given measured period $T_M$ by the extent of the trace in the circumferential direction and the magnitude of jitter components in the angular jitter at an angle by the depth or brightness of the trace at the angle. When the jittering angle of a jitter component thus displayed in the form of vector is expressed by $\Delta\theta_B$, the jittering time $\Delta t_k$ of the measured period $T_M(=kT_R)$ is calculated by the following equation (8):

$$\Delta t_k = (\Delta\theta/360)(k/f_R)(k/n). \tag{8}$$

It should be noted that while the display illustrated in FIG. 4 only shows one illuminated spot trace, if the division ratio n is set to ten, ten such traces, i.e., the number of traces equal to n, appear in the circumferential direction at equal intervals. This is because the frequency of signals used for vector display is 1/n the reference signal frequency $f_R$ for the serial digital signal, so that a period may be divided into n equal segments, whereby n signals having different phases can be generated at the vector display frequency. However, if k is an odd number, two possible waves having duty cycles closest to 50% exist with their phases being offset by 180°, so that 2 n illuminated spot traces may appear on the display.

Also, in the above jitter display, since the detector unit 20 employs a frequency heterodyne detection, the frequency deviation $\Delta f$ of the frequency component $f_M$ under measurement of the input serial digital signal does not change even after the detection. In this event, the center frequency merely changes from $f_M$ ($=f_R/k$) to $f_D$ ($=f_R/n$), i.e., the center frequency is increased by a factor of k/n. This means that the ratio of the center frequency to the frequency deviation is increased by a factor of k/n. Stated another way, equivalently, the frequency deviation $\Delta f$ is multiplied by an inverse of the ratio, i.e., by n/k. This means that the resolution of the jitter display is improved.

Figure 5:
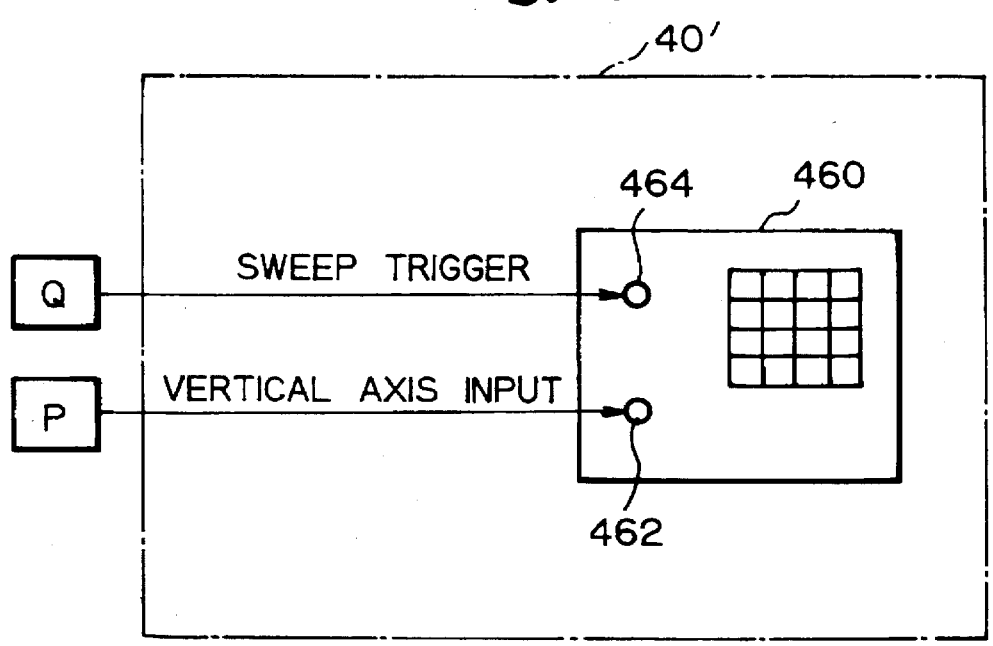
FIG. 5 is a block diagram showing a configuration for providing an eye pattern display.

While the jitter measuring apparatus according to the present invention has hereinabove been described in connection with a specific embodiment, the following modifications may be made thereto. First, although the embodiment has shown the configuration for measuring jitters for a serial digital signal transmitted at a single bit rate, the jitter measuring apparatus may be modified to be capable of measuring jitters for serial digital signals at different bit rates. In this case, among the oscillating frequency of the reference signal generator 200, division ratio n, and the passband of the BPF 240, factors required for this purpose may be made variable. Secondly, the heterodyne frequency conversion employed in the described embodiment may be omitted. For example, a digital signal of a low bit rate may be directly applied to the BPF 240 (the center frequency of its passband is equal to the measured frequency), and an oscillating signal having the measured frequency may be generated by the reference signal generator 200 and applied to the multiplier 410 and the phase shifter 420. Thirdly, while the vector display has been performed in the embodiment, the present invention can also provide eye pattern display. In this case, the vector display unit 40 may be replaced by an eye pattern display unit 40' shown in FIG. 5, wherein an oscilloscope 460 is applied at a vertical axis input 462 with the signal S6 at a point P in FIG. 3, and at a sweep trigger input 464 with the signal S3 at a point Q in FIG. 3.

According to the present invention as described above, since frequency deviated components are detected as they are and used for displaying jitters, jitters in bandwidth limited signals may also be measured. This feature of the present invention also facilitates the jitter measurement for a pathological signal which is a pulse train including an extremely small number of data transitions between 1 and 0. Further, if the heterodyne frequency conversion is employed, the jitter display resolution can be improved.

What is claimed is:

1. A method for measuring a jitter in a digital data signal transmitted at a bit rate, comprising the steps of:
   (a) defining a predetermined period associated with predetermined waveform portions included in said digital data signal, said predetermined waveform portions being used for measuring the jitter in the digital data signal;
   (b) defining a maximum width of fluctuation of period for fluctuations of periods of said predetermined waveform portions from said predetermined period, said fluctuations of the periods of said predetermined waveform portions from said predetermined period being detected as the jitter;
   (c) detecting a signal from said digital data signal, said detected signal including frequency components within a first range of frequency, said first range of frequency including a predetermined frequency corresponding to said predetermined period and having a bandwidth corresponding to said maximum width of fluctuation of period; and
   (d) displaying said jitter from said detected signal.

2. A method according to claim 1, wherein said step of displaying displays said jitter using said detected signal and a first oscillation signal having a first frequency.

3. A method according to claim 2, wherein said first frequency is equal to said predetermined frequency.

4. A method according to claim 2, wherein said first frequency is lower than said predetermined frequency.

5. A method according to claim 4, wherein said step of detecting includes the steps of:
   (a) converting the frequency of said digital data signal such that said predetermined frequency of said digital data signal is down-converted to be equal to said first frequency being lower than said predetermined frequency to thereby generate a frequency converted signal; and
   (b) detecting from said frequency converted signal frequency components present in a second range of frequency including said first frequency and having said bandwidth.

6. A method according to claim 5, wherein said step of converting includes mixing said digital data signal with a second oscillation signal having a second frequency, the difference between said second frequency and said predetermined frequency being equal to said first frequency.

7. A method according to claim 2 or 6, wherein said step of displaying displays said jitter in the form of vector from said detected signal and said first oscillation signal.

8. A method according to claim 7, wherein said step displaying displays said jitter in the form of eye pattern from said detected signal and said first oscillation signal.

9. An apparatus for measuring a jitter in a digital data signal transmitted at a bit rate, comprising:
   (a) detecting means coupled to receive said digital data signal for generating a detected signal including frequency components present within a first range of frequency in said digital data signal, said first range of frequency being determined by a predetermined frequency and a bandwidth, said predetermined frequency corresponding to a predetermined period associated with predetermined waveform portions included in said digital data signal, said predetermined waveform portions being used for measuring the jitter in the digital data signal, said bandwidth corresponding to a maximum width of fluctuation of period for fluctuations of periods of said predetermined waveform portions from said predetermined period, said fluctuations of the periods of said predetermined waveform portions from said predetermined period being detected as the jitter; and
   (b) display means for displaying the jitter from said detected signal and a first oscillation signal having a first frequency.

10. An apparatus according to claim 9, wherein said first frequency is equal to said predetermined frequency.

11. An apparatus according to claim 9, wherein said first frequency is lower than said predetermined frequency.

12. An apparatus according to claim 11, wherein said detecting means includes:
   (a) frequency converting means for converting the frequency of said digital data signal such that said predetermined frequency of said digital data signal is made equal to said first frequency being lower than said predetermined frequency to thereby generate a frequency converted signal; and
   (b) bandpass filter means coupled to receive said frequency converted signal for generating as said detected signal a filtered signal including frequency components present in a second range of frequency, said second range of frequency including said first frequency and having said bandwidth.

13. An apparatus according to claim 12, wherein said frequency converting means includes:

(a) means coupled to receive said digital signal for generating said first oscillation signal;

(b) means for generating a second oscillation signal having a second frequency from said first oscillation signal, the difference between said second frequency and said predetermined frequency being equal to said first frequency; and (c) mixing means for mixing said digital data signal with said second oscillation signal to generate said frequency converted signal.

14. An apparatus according to claim 10 or 13, wherein said display means displays said jitter in the form of vector from said detected signal and said first oscillation signal.

15. An apparatus according to claim 14, wherein said display means includes:

(a) a phase shifter for shifting in phase said first oscillation signal by 90° to generate a phase shifted oscillation signal;

(b) a first multiplier for multiplying said detected signal by said phase shifted oscillation signal to generate a first multiplied output;

(c) a second multiplier for multiplying said detected signal by said first oscillation signal to generate a second multiplied output;

(d) first low pass filter means for low-pass-filtering said first multiplier output to generate a first filtered output;

(e) second low pass filter means for low-pass-filtering said second multiplied output to generate a second filtered output; and (f) an X-Y monitor scope receiving said first and second low pass filtered outputs at X-axis and Y-axis being orthogonal to each other.

16. An apparatus according to claim 10 or 13, wherein said display means displays said jitter in the form of eye pattern from said detected signal and said first oscillation signal.

17. An apparatus according to claim 16, wherein said display means includes an oscilloscope which receives said detected signal at a vertical axis input and said first oscillation signal at a sweep trigger input.

* * * * *